United States Patent Office 3,214,441
Patented Oct. 26, 1965

3,214,441
N-[2-(SULFONYLTHIO)ETHYL]PHTHALIMIDE DERIVATIVES
Joseph E. Dunbar, Midland, Mich., assignor to The Dow Chemical Company, Midland, Mich., a corporation of Delaware
No Drawing. Filed Oct. 28, 1963, Ser. No. 319,554
7 Claims. (Cl. 260—326)

The present invention is directed to substituted thioethyl phthalimides corresponding to the formula:

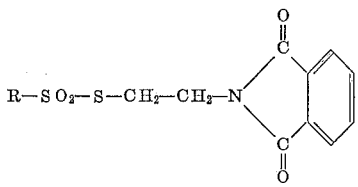

In this and succeeding formulae, R represents a member of the group consisting of lower alkyl, phenyl, lower alkylphenyl, halophenyl and lower alkylhalophenyl. In the present specification and claims, the expression "lower alkyl" is employed to designated an alkyl group containing up to and including six carbon atoms. These compounds are crystalline solids at room temperature and are somewhat soluble in many organic solvents and of low solubility in water. The compounds are useful as parasiticides and are adapted to be employed for the control of a number of insect, bacterial, helminth and fungal organisms such as worms, roaches, potato and tomato late blight, *Staphylococcus aureus*, *Aspergillus terreus* and *Pullularia pullulans*.

The novel phthalimides of the present invention are prepared by reacting an N-(2-haloethyl)phthalimide with an alkali metal salt of a thiosulfonic acid corresponding to the formula:

Alkali metal-S—SO$_2$—R

The reaction is conveniently carried out in an organic liquid as reaction medium such as sulfolane, dimethyl sulfoxide, acetone, dimethyl sulfone, dimethyl formamide, methanol or ethanol. The amounts of the reagents to be employed, reaction conditions and times are not critical, some of the desired product being obtained at once, when employing any proportion of the reactants. In a preferred method of operation, good results are obtained when employing one molecular proportion of the N-(2-haloethyl)phthalimide such as the bromo or chloro derivatives with one molecular proportion of the alkali metal salt of the thiosulfonic acid. The reaction takes place smoothly at temperatures in which the halide of reaction is formed and conveniently at temperatures from 20° to 130° C. It is ordinarily preferable to carry out the reaction at a temperature between 55° and 100° C.

In carrying out the reaction, the reactants are mixed and contacted together in any convenient fashion and the resulting mixture maintained in the reaction temperature range for a period of time to insure completion of the reaction. Following the reaction, the crude reaction mixture can be employed in many pesticidal uses. When a purified product is desired, such mixture is processed by conventional procedures to obtain the product in any desired degree of purity.

In a convenient procedure, the hot reaction mixture is filtered to remove the halide of reaction. The filtrate is allowed to cool to room temperature and is then diluted with ice water whereupon the desired product separates in the diluted medium as an oil or solid material. This oil or solid is then separated by decantation or filtration and further purified by successive washing with water or organic solvents and by recrystallization.

The following examples merely illustrate the invention and are not to be construed as limiting.

*Example 1.*—N-[2-(methylsulfonylthio)ethyl]phthalimide

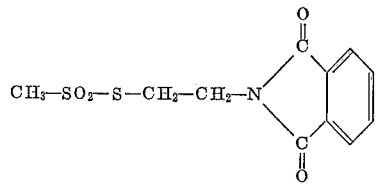

N-(2-bromoethyl)phthalimide (25.4 grams; 0.100 mole) and potassium methanethiosulfonate (15 grams; 0.100 mole) were dispersed in 100 milliliters of dimethyl formamide and the resulting mixture heated at 95° C. for one hour. During the heating period, potassium bromide of reaction precipitated in the reaction mixture. As the reaction neared completion, there was a substantial cessation in the production of the potassium bromide. The reaction mixture was allowed to reach room temperature and then diluted with ice water. During the dilution, the N-[2-(methylsulfonylthio)ethyl]phthalimide product precipitated in the diluted mixture. The solid product was recrystallized from ethanol to give colorless platelets which melted at 134°–134.5° C. The recrystallized product had carbon, hydrogen and nitrogen contents of 46.42, 4.23 and 4.68 percent, respectively, as compared to the theoretical contents of 46.30, 3.89 and 4.91 percent.

*Example 2.*—N-[2-(n-butylsulfonylthio)ethyl]phthalimide

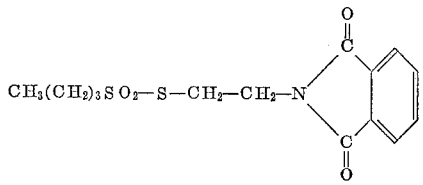

N-(2-bromoethyl)phthalimide (25.4 grams; 0.100 mole) and potassium n-butanethiosulfonate (19.2 grams; 0.100 mole) were dispersed in 100 milliliters of dimethyl formamide. The resulting reaction mixture was heated at 95° C. for one hour and thereafter cooled to room temperature. The reaction mixture was then diluted with ice water. During the dilution procedure, the mixture separated into an aqueous layer and an organic layer. A small portion of the organic layer was removed, triturated with ethanol and dissolved in diethyl ether from which the N-[2-(n-butylsulfonylthio)ethyl]phthalimide product crystallized. The crystals thus obtained were collected by filtration and used to seed the remaining portion of the organic layer, thus initiating crystallization. Upon formation, the solid material was separated by filtration and recrystallized from ethanol to yield the product as colorless platelets which melted at 76.5°–78° C. The recrystallized product had carbon, hydrogen and nitrogen contents of 51.27, 5.17 and 4.11 percent, respectively, as compared to theoretical contents of 51.35, 5.24 and 4.28 percent.

*Example 3.*—N-[2-(p-tolylsulfonylthio)ethyl]phthalimide

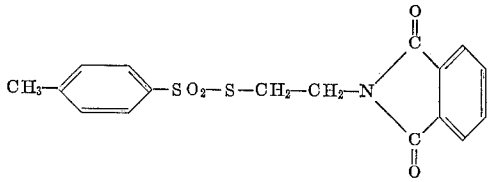

Potassium p-toluenethiosulfonate (22.6 grams; 0.100 mole) and N-(2-bromoethyl)phthalimide (25.4 grams; 0.100 mole) were dispersed in 100 milliliters of dimethyl formamide and the resulting mixture heated with stirring at a temperature of 95° for one hour. The resulting mixture was thereafter cooled to room temperature and diluted with ice water. During this dilution, the mixture separated into an aqueous layer and a brownish yellow organic layer. The organic layer solidified upon standing to yield the N-[2-(p-tolylsulfonylthio)ethyl]phthalimide product. The product was twice recrystallized from ethanol employing activated charcoal as a decolorizing agent during the first recrystallization. The colorless recrystallized product melted at 108.5°–110° C. and had carbon, hydrogen and nitrogen contents of 56.48, 4.31 and 3.82 percent, respectively, as compared to theoretical contents of 56.49, 4.18 and 3.88 percent.

*Example 4.—N-[2-(3,4-dichlorophenylsulfonylthio)ethyl]phthalimide*

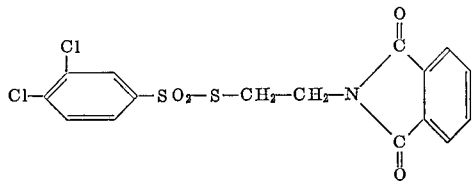

Potassium 3,4-dichlorobenzenethiosulfonate (14.2 grams; 0.0500 mole) and N-(2-bromoethyl)phthalimide (12.7 grams; 0.0500 mole) were dispersed in 50 milliliters of dimethyl formamide and the resulting mixture heated at a temperature of 95° C. for one hour. The resulting mixture was allowed to reach room temperature and was then diluted with ice water. During the dilution procedure, the N-[2-(3,4-dichlorophenylsulfonylthio)ethyl]phthalimide product separated from the reaction mixture as an oil which solidified upon standing. This solid was then collected on a filter and twice recrystallized from ethanol. The colorless recrystallized product melted at 133°–134° C. and had carbon, hydrogen and nitrogen contents of 46.27, 2.74 and 3.28 percent, repectively, as compared with the theoretical contents of 46.16, 2.66 and 3.37 percent.

In a similar manner, other products of the present invention are prepared as follows:

N - [2 - (3,4-dibromophenylsulfonylthio)ethyl]phthalimide (molecular weight of 505) by reacting together potassium 3,4-dibromobenzenethiosulfonate and N-(2-bromoethyl)phthalimide.

N - [2 - (3,5-dichloro-p-tolysulfonylthio)ethyl]phthalimide (molecular weight of 431) by reacting together potassium 3,5-dichloro-p-toluenethiosulfonate and N-(2-bromoethyl)phthalimide.

N-[2-(phenylsulfonylthio)ethyl]phthalimide (melting at 110.5° to 111.5° C. and having carbon, hydrogen and nitrogen contents of 55.42, 3.75 and 3.93 percent, respectively, as compared to theoretical contents of 55.32, 3.77 and 4.03 percent) by reacting together potassium benzenethiosulfonate and N-(2-bromoethyl)phthalimide.

N - [2 - (3-iodophenylsulfonylthio)ethyl]phthalimide (molecular weight of 573) by reacting together potassium 3-iodobenzenethiosulfonate and N-(2-bromoethyl)phthalimide.

N - [2-(4-bromophenylsulfonylthio)ethyl]phthalimide (melting at 133°–134° C. and having carbon and hydrogen contents of 45.20 and 2.86 percent, respectively, as compared to theoretical contents of 45.08 and 2.84 percent) by reacting together potassium 4-bromobenzenethiosulfonate and N-(2-bromoethyl)phthalimide.

N - [2 - (3,5-diethylbenzenesulfonylthio)ethyl]phthalimide (molecular weight of 403) by reacting together potassium 3,5-diethylbenzenethiosulfonate with N-(2-chloroethyl)phthalimide.

N - [2 - (3,4,5-trimethylbenzenesulfonylthio)ethyl]phthalimide (molecular weight of 350) by reacting together potassium 3,4,5 - trimethylbenzenethiosulphonate with N-(2-bromoethyl)phthalimide.

N - [2 - (2-chloro-5-methylphenylsulfonylthio)ethyl]phthalimide (molecular weight of 395) by reacting together potassium 2-chloro-5-methylbenzenethiosulfonate and N-(2-bromoethyl)phthalimide.

N - [2 - (2,4,5 - trichlorophenylsulfonylthio)ethyl]phthalimide (molecular weight of 450) by reacting together potassium 2,4,5-trichlorobenzenethiosulfonate with N-(2-bromoethyl)phthalimide.

N - [2-(2,4,6-tribromophenylsulfonylthio)ethyl]phthalimide (molecular weight of 584) by reacting together potassium 2,4,6-tribromobenzenethiosulfonate with N-(2-bromoethyl)phthalimide.

N - [2 - (pentachlorophenylsulfonylthio)ethyl]phthalimide (molecular weight of 519) by reacting together potassium pentachlorobenzenethiosulfonate with N-(2-bromoethyl)phthalimide.

N - [2 - (2,5-dimethylsulfonylthio)ethyl]phthalimide (melting at 91.5°–92.5° C. and having carbon, hydrogen and nitrogen contents of 57.47, 4.63 and 3.62 percent, respectively, as compared to theoretical contents of 57.58, 4.57 and 3.73 percent) by reacting together potassium 2,5-dimethylbenzenethiosulfonate and N-(2-bromoethyl)phthalimide.

N-[2-(ethylsulfonylthio)ethyl]phthalimide (melting at 133.5°–134° C. and having carbon, hydrogen and nitrogen contents of 48.14, 4.38 and 4.80 percent, respectively, as compared to theoretical contents of 48.14, 4.38 and 4.68 percent) by reacting together potassium ethanethiosulfonate and N-(2-bromoethyl)phthalimide.

The compounds of the present invention can be employed as the toxic constituent in compositions utilized for the killing and control of insect, bacterial and fungal pests. In such usage, the compounds are combined with one or a plurality of adjuvants or helpers including water, organic solvents, petroleum oils and other liquid carriers, surface active dispersing agents and finely divided solids such as chalk, talc or bentonite. The compounds may also be employed in water-in-oil and oil-in-water emulsions.

In representative operations, N-[2-(methylsulfonylthio)ethyl]phthalimide, N - [2 - (n - butylsulfonylthio)ethyl]phthalimide, N - [2-(ethylsulfonylthio)ethyl]phthalimide and N - [2-(phenylsulfonylthio)ethyl]phthalimide each gave excellent control and kill of tomato late blight when employed in aqueous compositions at concentrations of 300 parts per million by weight. In further operations, N-[2-(n-butylsulfonylthio)ethyl]phthalimide when employed at concentrations of one percent by weight gave excellent control and kill of *Staphylococcus aureus, Aspergillus terreus* and *Pullularia pullulans*.

The thiosulfonates employed as starting materials in accordance with the teachings of the present invention can be prepared in accordance with known methods. In one method, potassium hydrosulfide (KSH) is reacted with a suitable lower alkane, benzene, phenyl, halobenzene, lower alkylbenzene or lower haloalkylbenzene sulfonyl halide. Representative halides include hexanesulfonyl chloride, tert.-butanesulfonyl bromide, 4-methylpentanesulfonyl chloride, 4-hexylbenzenesulfonyl chloride, 2,6-dichloro-4-propylbenzenesulfonyl bromide, propanesulfonyl chloride, pentamethylbenzenesulfonyl chloride, 4-iodobenzenesulfonyl chloride and 2,5-diethylbenzenesulfonyl chloride. In a convenient procedure, the reaction is carried out by adding the sulfonyl halide to an aqueous or alcoholic solution of potassium hydroxide saturated with $H_2S$. Upon completion of the reaction, the desired starting materials are separated by conventional procedures.

The N-(2-haloethyl)phthalimides as employed in the present invention wherein halo represents chlorine, bromine or iodine can be prepared by known methods. In a convenient method, potassium phthalimide is reacted portionwise with an ethylene dihalide in an organic solvent as reaction medium. The reaction takes place readily at the boiling temperature of the reaction medium. The desired starting material is separated in conventional fashion as a crystalline solid.

I claim:
1. A compound corresponding to the formula

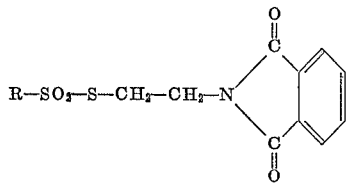

wherein R represents a member of the group consisting of lower alkyl, phenyl, lower alkylphenyl, halophenyl and lower alkylhalophenyl.
2. N-[2-(methylsulfonylthio)ethyl]phthalimide.
3. N-[2-(n-butylsulfonylthio)ethyl]phthalimide.
4. N-[2-(ethylsulfonylthio)ethyl]phthalimide.
5. N-[2-(phenylsulfonylthio)ethyl]phthalimide.
6. N-[2-(p-tolylsulfonylthio)ethyl]phthalimide.
7. N-[2-(2,5-dimethylphenylsulfonylthio)ethyl]phthalimide.

References Cited by the Examiner
UNITED STATES PATENTS
2,816,111  12/57  Wegler et al. _____ 260—326

NICHOLAS S. RIZZO, *Primary Examiner.*